(12) United States Patent
Roozeboom et al.

(10) Patent No.: US 7,772,800 B2
(45) Date of Patent: Aug. 10, 2010

(54) ENERGY SYSTEM COMPRISING AN ELECTROCHEMICAL ENERGY SOURCE

(75) Inventors: Freddy Roozeboom, Eindhoven (NL); Peter Notten, Endhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 505 days.

(21) Appl. No.: 11/719,867

(22) PCT Filed: Nov. 25, 2005

(86) PCT No.: PCT/IB2005/053911
§ 371 (c)(1),
(2), (4) Date: May 22, 2007

(87) PCT Pub. No.: WO2006/056963
PCT Pub. Date: Jun. 1, 2006

(65) Prior Publication Data
US 2009/0230915 A1  Sep. 17, 2009

(30) Foreign Application Priority Data
Nov. 26, 2004 (EP) .................. 04106119

(51) Int. Cl.
*H01M 10/46* (2006.01)
(52) U.S. Cl. .................................... 320/107
(58) Field of Classification Search .......... 320/101, 320/107, 112; 323/906; 136/243, 293; 429/209, 429/231.9
See application file for complete search history.

(56) References Cited

U.S. PATENT DOCUMENTS

| 4,740,431 | A | 4/1988 | Little |
| 6,197,450 | B1 | 3/2001 | Nathan et al. |
| 6,723,470 | B2 * | 4/2004 | Barker et al. ............. 429/231.3 |
| 6,730,440 | B1 * | 5/2004 | Bauer et al. ................. 429/249 |
| 2001/0033959 | A1 * | 10/2001 | Ovshinsky et al. ............ 429/40 |
| 2003/0099884 | A1 * | 5/2003 | Chiang et al. ............... 429/233 |
| 2004/0185310 | A1 | 9/2004 | Jenson et al. |
| 2004/0185667 | A1 | 9/2004 | Jenson |

FOREIGN PATENT DOCUMENTS

| EP | 0108492 A2 | 5/1984 |
| WO | WO0025378 A1 | 5/2000 |
| WO | WO0242831 A2 | 5/2002 |
| WO | WO2005027245 A2 | 3/2005 |
| WO | WO2005036711 A2 | 4/2005 |

* cited by examiner

Primary Examiner—Edward Tso (57) ABSTRACT

The invention relates to an energy system comprising an electrochemical energy source, wherein said electrochemical energy source comprises at least one assembly of a first electrode, a second electrode, and an intermediate solid-state electrolyte separating said first electrode and said second electrode. The invention also relates to an electronic module provided with such an energy system. The invention further relates to an electronic device provided with such an energy system. Moreover, the invention relates to a method of manufacturing of such an energy system.

28 Claims, 4 Drawing Sheets

ENERGY SYSTEM COMPRISING AN ELECTROCHEMICAL ENERGY SOURCE

The invention relates to an energy system comprising an electrochemical energy source, wherein said electrochemical energy source comprises at least one assembly of a first electrode, a second electrode, and an intermediate solid-state electrolyte separating said first electrode and said second electrode. The invention also relates to an electronic module provided with such an energy system. The invention further relates to an electronic device provided with such an energy system. Moreover, the invention relates to a method of manufacturing of such an energy system.

Electrochemical energy sources based on solid-state electrolytes are known in the art. These (planar) energy sources, or 'solid-state batteries', are constructed as stated in the preamble. Solid-state batteries efficiently and cleanly convert chemical energy directly into electrical energy and are often used as the power sources for portable electronics. At a smaller scale such batteries can be used to supply electrical energy to e.g. microelectronic modules, more particular to integrated circuits (IC's). An example hereof is disclosed in the international patent application WO 00/25378, where a solid-state thin-film micro battery is fabricated directly onto a specific substrate. During this fabrication process the first electrode, the intermediate solid-state electrolyte, and the second electrode are subsequently deposited onto the substrate. Although the known micro battery exhibits commonly superior performance as compared to other solid-state batteries, the known micro battery has several drawbacks. A major drawback of the known micro battery of WO 00/25378 is that its manufacturing process is relatively complex and therefore relatively expensive. Another drawback of the known micro battery is that charging the known battery requires a switching device for reversing the polarity to supply electrical energy to the battery. To this end it is necessary to connect the battery to the mains or any other external electrical power source to be able to charge the battery, which makes the known battery dependent on the availability of these external electrical energy sources to be charged.

It is an object of the invention to provide an improved electrochemical energy system, which can be constructed and manufactured in a relatively simple manner, and wherein an electrochemical energy of the energy system can be charged relatively efficiently.

The object of the invention is achieved by an energy system according to the preamble, characterized in that said first electrode comprises a first conductive substrate on which the solid-state electrolyte and the second electrode have been deposited, and that the energy system further comprises an energy conversion means electrically connected to said electrochemical energy source for conversion of external energy into electric energy for charging the electrochemical energy source. The integration of said first substrate and at least a part of said first electrode leads commonly to a simpler construction of the (micro)battery compared to those known in the art. Moreover, the way of manufacturing of an energy source according to the invention is also simpler, as at least one process step can be eliminated. The relatively simple manufacturing method of the energy system according to the invention may furthermore lead to a significant cost saving. Preferably, the solid-state electrolyte and the second electrode are deposited on the first electrode as thin film layers with a thickness of approximately between 0.5 and 5 micrometer. Thin film layers result in higher current densities and efficiencies because the transport of ions in the energy source is easier and faster through thin-film layers than through thick-film layers. In this way the internal energy loss may be minimized. As the internal resistance of the energy source is relatively low the charging speed may be increased when a rechargeable energy source is applied. A further major advantage of the energy system according to the invention is that the energy system comprises the conversion means for supplying electrical energy to the electrochemical energy source. The conversion thereby converts external energy absorbed from the direct environment surrounding the energy system—not being electrical energy—into electrical energy for applying a (battery) charging current to the electrochemical energy source. In this way the electrochemical energy source can be charged relatively efficiently and (more) autonomously, without the need of a separate relatively complex and expensive electrical (micro)battery charger and the need of an external electrical power source. The improved way of scavenging and storage of energy by the (autonomous) energy system thereby results in a relatively high degree of freedom of design of the energy system.

In a preferred embodiment at least a part of the first electrode facing the electrolyte and the second electrode is patterned at least partially. In this way a increased contact surface per volume between both electrodes and the solid-state electrolyte is obtained. Commonly, this increase of the contact surface(s) between the components of the energy source according to the invention leads to an improved rate capacity of the energy source, and hence a better battery capacity (due to an optimal utilization of the volume of the layers of the energy source). In this way the power density and energy density in the energy source may be maximized and thus optimized. The nature, shape, and dimensioning of the pattern may be arbitrary. In general, the contact surface may be patterned in various ways, e.g. by providing extensions to the first electrode. Preferably, the first electrode, in particular the substrate, is provided with a plurality of cavities of an arbitrary shape and dimensioning. The electrolyte and the second electrode are preferably provided to at least a part of an inner surface of said cavities. This has the advantage that the contact surface between the electrical components of the electrochemical energy source, and hence the power density and the energy density of the electrochemical energy source, can be increased significantly. In an embodiment the cavities are linked, through which multiple protruding pillars are formed on the first substrate to increase the contact surface within the electrochemical energy source. In another preferred embodiment at least a part of the cavities form slits, holes or trenches in which the solid-state electrolyte and the second electrode are deposited. The pattern, more particular the cavities, of the first electrode, in particular of the first conductive substrate, may be formed for example by way of etching.

In another preferred embodiment the cavities are linked, through which one or multiple protruding elements, in particular pillars, are formed on the substrate to increase the effective contact surface within the electrochemical energy source of the energy system. Instead of using trenches or pores, which involve processing for forming and filling a hole in the form of a trench or a pore in the substrate, thus also an inverted structure can be used. The pillars of the first electrode are preferably formed by an etching process that forms vertical pillars in the substrate of the first electrode instead of vertical holes. The shape and dimensioning of the pillars may be of various nature and are preferably dependent on the field of application of the energy system according to the invention. This also allows an easier three-dimensional diffusion of gaseous reagents and reaction products, thus enabling higher reaction rates in the processes involved, e.g., dry-etching etching of the features and deposition of LPCVD or ALD-grown layers onto the features.

As mentioned above, the conversion means are adapted for conversion of a certain state of (external) energy, preferably durable energy and not being electrical energy, into electrical energy. The external energy can be obtained via the environment surrounding the energy system. Preferably, the energy conversion of the energy conversion means is based on at least one of the following energy conversion principles: thermoelectric conversion, photoelectric conversion, magnetoelectric conversion, windelectric conversion, and piezoelectric conversion. Thermoelectric conversion is conversion of heat into electrical energy, and photoelectric conversion is based on the conversion of light, in particular (solar) radiation, into electrical energy. The latter conversion can for example be realized by a photovoltaic converter, in particular a solar cell. Electrical energy can also be obtained by conversion of a certain magnetic induction. The conversion means can even be adapted for conversion of wind energy, or at least energy stored in a gas flow, into electrical energy. Alternatively, the conversion means are adapted to convert a certain mechanical pressure into electrical energy. In this latter embodiment the conversion means is preferably provided with piezoelectric crystals to achieve this conversion. It must be clear that the invention is by no means limited to the embodiments described afore. Within the framework of the claims as enclosed, a variety of other embodiments are possible which will be obvious for a person skilled in the art.

Preferably, the energy conversion means is connected to both the first electrode and the second electrode thereby allowing charging of the electrochemical energy source. In a particular preferred embodiment the connection of the energy conversion means to at least one of the first electrode and the second electrode is interruptible. In this manner the conversion means can be disconnected from the energy source. Disconnection of the conversion means from the electrochemical energy source can be desirable under certain circumstances, for example in case of (temporary) non-using the (charged) electrochemical energy source. To disconnect the conversion means from the electrochemical energy source use can be made of a (micro)switch or actuator, which may be controlled electronically. In another particular preferred embodiment the energy conversion means is releasably coupled to the electrochemical energy source, which can be desirable for example in case of maintenance and/or replacement of the conversion means and/or the electrochemical energy source.

The energy system according to the invention may be provided with a single energy conversion cell, such as a photovoltaic cell. However, to increase the charging speed of the electrochemical energy source it may be advantageous that said energy conversion means comprises multiple energy conversion cells. Commonly, these cells will be of the same type, wherein for example multiple solar cells are connected to the electrochemical energy source. However, in an alternative embodiment different types of conversion cells are applied, wherein for example both a solar cell and a piezoelectric converter are connected to the electrochemical energy source.

In a preferred embodiment, the energy conversion means comprises a second conductive substrate, preferably made of (doped) silicon. It is advantageous in case the first conductive substrate and the second conductive substrate are formed by the same substrate, as a result of which a relatively simple, efficient and compact integrated energy system can be obtained. In another preferred embodiment the electrochemical energy source and the energy conversion means are substantially stacked together to form a relatively compact laminated energy system.

In a preferred embodiment the substrates, id est the first substrate and—if applicable—the second substrate, are made of at least one of the following materials: C, Si, Sn, Ti, Ge and Pb. A combination of these materials may also be used to form the substrate(s). Preferably, n-type or p-type doped Si is used as substrate, or a doped Si-related compound, like SiGe or SiGeC. Also other suitable materials may be applied as first substrate, provided that the material of the first substrate is adapted for intercalation and storing of ions such as e.g. of those atoms as mentioned in the previous paragraph. Moreover, these materials are preferably suitable to undergo an etching process to apply a pattern (holes, trenches, pillars, etc.) on the contact surface of the substrate.

In an embodiment the first electrode is at least partially adapted for (temporary) storage of ions of at least one of following atoms: H, Li, Be, Mg, Na and K. So, the electrochemical energy source of the energy system according to the invention may be based on various intercalation mechanisms and is therefore suitable to form different kinds of batteries, e.g. Li-ion batteries, NiMH batteries, et cetera.

Preferably, the first electrode further comprises an intercalating top layer deposited onto the first conductive substrate, wherein the intercalating top layer and the first conductive substrate are separated by means of an electron-conductive barrier layer adapted to at least substantially preclude diffusion of intercalating ions into said first conductive substrate. This preferred embodiment is commonly very advantageous, since intercalating ions taking part of the (re)charge cycles of the electrochemical source of the energy system according to the invention often diffuse into the first substrate, such that these ions do no longer participate in the (re)charge cycles, resulting in a reduced storage capacity of the electrochemical source. Commonly, a monocrystalline silicon conductive substrate is applied to carry electronic components, such as integrated circuit, chips, displays, et cetera. This crystalline silicon substrate suffers from this drawback that the intercalating ions diffuse relatively easily into said substrate, resulting in a reduced capacity of said energy source. For this reason it is considerably advantageous to apply a barrier layer onto said first substrate to preclude said unfavorable diffusion into the substrate. Migration of the intercalating ions will be blocked at least substantially by said barrier layer, as a result of which migration of these ions through the substrate will no longer occur, while migration of electrons through said substrate is still possible. According to this embodiment it is no longer necessary that the substrate is adapted for storage of the intercalating ions. To this end, merely the top layer will act as an intercalating layer adapted for temporary storage (and release) of ions of for example lithium. Therefore, it is also possible to apply electron-conductive substrates other than silicon substrates, like substrates made of metals, conductive polymers, et cetera. The so formed laminate of said first substrate, said barrier layer, and said top layer as intercalating layer will commonly be formed—as mentioned afore—by stacking (depositing) the barrier layer and subsequently the intercalating layer onto said substrate, for example by way of low pressure Chemical Vapor Deposition (LPCVD). However, in a particular embodiment the laminate can also be formed by means of implantation techniques, wherein for example a crystalline silicon substrate is bombarded with for example tantalum ions and nitrogen ions, after which the temperature of the implanted substrate is sufficiently raised to form the physical barrier layer buried within said original substrate. As a result of the bombardment of the silicon substrate with ions, commonly the lattice of the crystalline top layer of the original substrate will be destructed, resulting in an amorphous top layer forming said intercalating layer. In a preferred embodiment said intercalating top layer is at least substantially made of silicon, preferably doped amorphous silicon. An amorphous silicon layer has an outstanding property to store (and release) relatively large amounts of intercalating ions per unit of volume, which results in an improved storage capacity of the electrochemical source according to the invention. Said barrier layer is preferably at least substantially made of at least one of the following compounds: tantalum, tantalum nitride, and titanium nitride. The material of the barrier layer is however not limited to these compounds. These compounds has as common property a relatively dense structure which is impermeable for the intercalating ions, among which lithium ions.

The solid-state electrolyte applied in the energy source of the energy system according to the invention may be based either on ionic conducting mechanisms or non-electronic conducting mechanisms, e.g. ionic conductors for H, Li, Be and Mg. An example of a Li conductor as solid-state electrolyte is Lithium Phosphorus Oxynitride (LiPON). Other known solid-state electrolytes like e.g. Lithium Silicon Oxynitride (LiSiON), Lithium Niobate (LiNbO$_3$), Lithium Tantalate (LiTaO$_3$), Lithium orthotungstate (Li$_2$WO$_4$), and Lithium Germanium Oxynitride (LiGeON) may also be used as lithium conducting solid-state electrolyte. A proton conducting electrolyte may for example be formed by TiO(OH). Detailed information on proton conducting electrolytes is disclosed in the international application WO 02/42831. The second (positive) electrode for a lithium ion based energy source may be manufactured of metal-oxide based materials, e.g. LiCoO$_2$, LiNiO$_2$, LiMnO$_2$ or a combination of these such as. e.g. Li(NiCoMn)O$_2$. Examples of a second (positive) electrode in case of a proton based energy source are Ni(OH)$_2$ and NiM(OH)$_2$, wherein M is formed by one or more elements selected from the group of e.g. Cd, Co, or Bi.

In yet another embodiment the solid-state electrolyte and the second electrode are deposited on multiple sides of the first substrate. In this way the substrate is used more intensively for storage of ions, thereby increasing the electric capacity of the electrochemical energy source according to the invention. However, it is also conceivable to use a side of the first substrate as part of the conversion means, while another side of the first substrate is used as part of the electrochemical energy source. In this way a relatively complex energy system according to the invention can be provided.

Preferably, the electrochemical energy source comprises multiple assemblies electrically coupled together. The assemblies may be coupled both in a serial and/or in a parallel way dependent on the requirements of the application of the electrochemical energy source. When a relatively high current is required, the first electrodes and the second electrodes of several assemblies are electrically coupled in parallel, respectively. When a relatively high voltage is required, the first electrode of a first assembly may be electrically coupled to the second electrode of a second assembly. The first electrode of the second assembly may be electrically coupled to a second electrode of a third assembly and so forth.

At least one of the first electrode and the second electrode is preferably coupled to a current collector. In case of a silicon substrate a current collector may not be needed for the first electrode. However, for e.g. a Li-ion battery with a LiCoO$_2$ electrode as second electrode preferably an aluminum current collector (layer) is applied. Alternatively or in addition a current collector manufactured of, preferably doped, semiconductor such as e.g. Si, GaAs, InP, as of a metal such as copper or nickel may be applied as current collector in general with solid-state energy sources according to the invention.

The substrate may have a main surface on or in which the cavities are formed and which defines a plane. A perpendicular projection of the current collector onto this plane may at least party overlap with a perpendicular projection of a cavity, and preferably with all cavities, onto this plane. In this way the current collector is relatively near by the cavity, which increases the maximum current. In an embodiment the current collector extends into a cavity, preferably into all cavities. This increases the rate capacity further. It is particularly advantageous for relatively deep cavities having a depth of 20 micrometer or more.

The first substrate may comprise a first part, which constitutes the first electrode, and a second part free from the first part. The second part may comprise an electric device integrated in the second part. Preferably, the first substrate comprises a barrier layer for reducing and preferably substantially preventing diffusion of ions from the first part to the second part. When the substrate is adapted for storage of Li-ions, for example by applying a silicon wafer, such a barrier layer can be formed of Si$_3$N$_4$ or SiO$_2$ to prevent the Li-ions to exit the first electrode (wafer). Alternatively, the substrate comprises a third part functioning as basic component of the conversion means. In this way, the energy system according to the invention can be integrated relatively simple and compact with an electronic module or device, such as a integrated chip ((IC).

Preferably, the first substrate is supported by a support structure in order to consolidate the electrochemical energy source. In specific cases application of such a support structure may be desirable. For example if a titanium (-related) first substrate is used for hydrogen storage in a nigh battery with a structure according to the invention, a support structure may be used to strengthen the construction of the energy source. Noted is that a titanium substrate may be manufactured by way of a (temporarily) dielectric layer on which the substrate is deposited. After this depositing process the dielectric layer may be removed. For further support of the titanium substrate the electrically non-conducting support structure may be used. It may be advantageous to remove the substrate partially by decreasing its thickness, and therefore improving the energy density of the energy source. For example from a first substrate with a thickness of about 500 micrometer the energy source may be transferred to a first substrate with a thickness of about 10-200 micrometer. To establish this adaptation of the first substrate the (known) 'substrate transfer technology' may be applied.

The invention also relates to an electronic module provided with at least one of such an energy system. The electronic module may be formed by an integrated circuit (IC), microchip, display, et cetera. The combination of the electronic module and the energy system may be constructed in a monolithic or in non-monolithic way. In case of a monolithic construction of said combination preferably a barrier layer for ions is applied between the electronic module and the energy system, in particular the energy source thereof. In an embodiment the electronic module and the energy source system are comprised by a System in Package (SiP). The package is preferably non-conducting and comprises a container for the aforementioned combination. In this way an autonomous ready-to-use SiP may be provided in which besides the electronic module an energy system according to the invention is provided.

The invention further relates to an electronic device provided with at least one of such an energy system, or more preferably such an electronic module. An example of such an electric device is a shaver, wherein the electrochemical energy source may function for example as backup (or primary) power source. Other applications which can be enhanced by providing a backup power supply comprising an energy system according to the invention are for example portable RF modules (like e.g. cell phones, radio modules, et cetera), sensors and actuators in (autonomous) micro systems, energy and light management systems, but also digital signal processors and autonomous devices for ambient intelligence. It may be clear this enumeration may certainly not being considered as being limitative. Another example of an electric device wherein an energy source according to the invention may be incorporated is a so-called 'smart card' containing a microprocessor chip. Current smart cards require a separate bulky card reader to display the information stored on the card's chip. But with a, preferably flexible micro battery, the smart-card may comprise for example a relatively tiny display screen on the card itself that allows users easy access to data, stored on the smart card.

Moreover, the invention relates to a method for manufacturing of such an energy system, comprising the steps of: A) depositing a solid-state electrolyte onto a first conductive substrate, B) depositing a second electrode onto the solid-state electrolyte, and C) subsequently electrically connecting an energy conversion means to both the first conductive substrate and the second electrode. During the application of step A) and step B) preferably one of the following deposition techniques is used: Physical Vapor Deposition (PVD), Chemical Vapor Deposition (CVD), and Atomic Vapor Deposition (AVD). Examples of PVD are sputtering and laser ablation that requires commonly cavities widths of the order of $\geqq 20$ micrometer. Examples of CVD are LP-CVD and Atomic Layer Deposition (ALD). The AVD is preferably carried out at relatively low pressures (approximately 150 mbar or lower). These techniques are well known for the artisan and allow a pore diameter in the substrate of the order of >0.5 micrometer. During step C) the conversion means can be connected to the first substrate, acting as at least a part of the first electrode, and to the second electrode by means of (known) bumping techniques or wire-bonding techniques.

In a preferred embodiment the method is provided with step D) comprising patterning at least one contact surface of the substrate, wherein step D) is applied preceding prior to step A). As explained afore the patterning of a surface of the substrate increases the contact surface per volume unit of the different components of the energy source, thereby increasing the rate capability. In an embodiment an and/or of etching technique may be used for patterning such as wet chemical etching and dry etching. Well-known examples of these techniques are Reactive-ion Etching (RIE) and Focused Ion Beam (FIB).

Preferably, the method is provided with step E) comprising subsequently depositing of a electron-conducting barrier layer and a intercalation layer on the first substrate, wherein step E) is applied prior to step A). Advantages of this embodiment have been elucidated above in a comprehensive manner.

The invention is illustrated by way of the following non-limitative examples, wherein.

Figure 1:
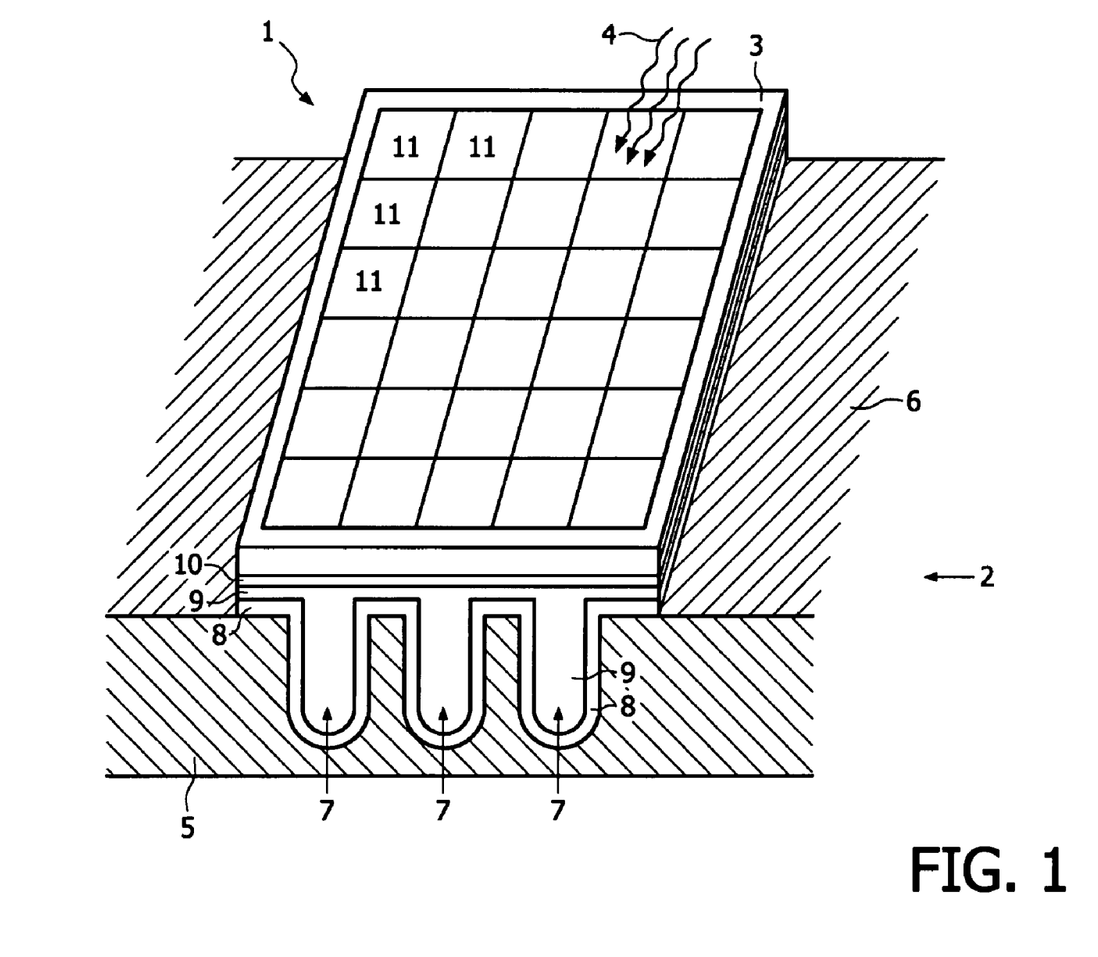
FIG. 1 shows a perspective view of an energy system according to the invention.

FIG. 1 shows a perspective view of an energy system 1 according to the invention. The energy system 1 comprises a Li-ion micro battery 2, and a solar panel 3 connected to said battery 3 for providing a charging current for said battery 3 upon receipt of photons 4. The energy source 2 comprises a silicon substrate 5 which functions as a negative electrode of the battery 3. The silicon substrate 5 may for example be formed by a silicon wafer often used for ICs. The substrate 5 may have a thickness larger than 20 micrometer, larger than 100 micrometer or even larger than 500 micrometer. In an upper surface 6 of the silicon substrate 5 several slits 7 are etched by way of existing etching techniques. The dimensioning of these slits 7 can be arbitrary. Preferably, the width of a slit 7 is approximately between 2 and 10 micrometer and the depth of the slit 7 is approximately between 10 and 100 micrometer. On the patterned upper surface 6 a solid-state electrolyte layer 8 is deposited. The electrolyte layer 8 has a thickness of about 1 micrometer, and is preferably made of Lithium Phosphorus Oxynitride (LiPON). On the LiPON layer 8 a positive electrode layer 9 is deposited with a thickness of about 1 micrometer. The positive electrode 9 is preferably made of $LiCoO_2$, eventually mixed with carbon fibers. The depositing of the electrolyte 8 and the positive electrode 9 onto the upper surface 6 of the substrate 5 occurs by way of conventional depositing techniques, such as chemical or physical vapor deposition, and atomic layer deposition. By etching the substrate 5 the contact surface between both electrodes 5, 9 and the electrolyte 8 may be increased (significantly) per volume unit, resulting in an improved (maximized) rate capability and power density and energy density in the energy source 2. An aluminum current collector 10 is coupled to the positive electrode 9. The construction of the energy source 2 as shown is a relatively efficient and simple construction, and is furthermore relatively simple to manufacture. Moreover, the performance of the shown energy source 2 is optimized by minimizing the layer thickness of the electrolyte and maximizing the mutual contact surface between the components 5, 8, 9 of the energy source 2. The solar panel 3 comprises multiple solar cells 11, wherein each cell 11 is adapted for conversion of (solar) light into electrical energy for charging the battery 2. As is shown in FIG. 1 the solar panel 3 is positioned on top of the aluminum current collector 10, wherein an electrode (not shown) of the solar panel 3 is in electrical contact with the aluminum current collector 10. Another electrode (not shown) of the solar panel is electrically connected to the substrate 5 of the battery 2. In the example as shown the energy density of the thin-film battery 2 is of the order of $2.5 \cdot 10^{-3}$ $C/mm^2 \cdot \mu m$, which is relatively high when compared with conventional batteries of capacitors. Assuming that the solar radiative power density E is 100 $W/m^2$ and that the solar cell efficiency is about 10%, this will lead to an electrical power density of 1 $mW/cm^2$. As the battery energy density is about 10 $mWh/\mu m \cdot cm^2$ it takes approximately 10 hours to fully charge the battery 2 by its co-integrated solar panel 3.

Figure 2:
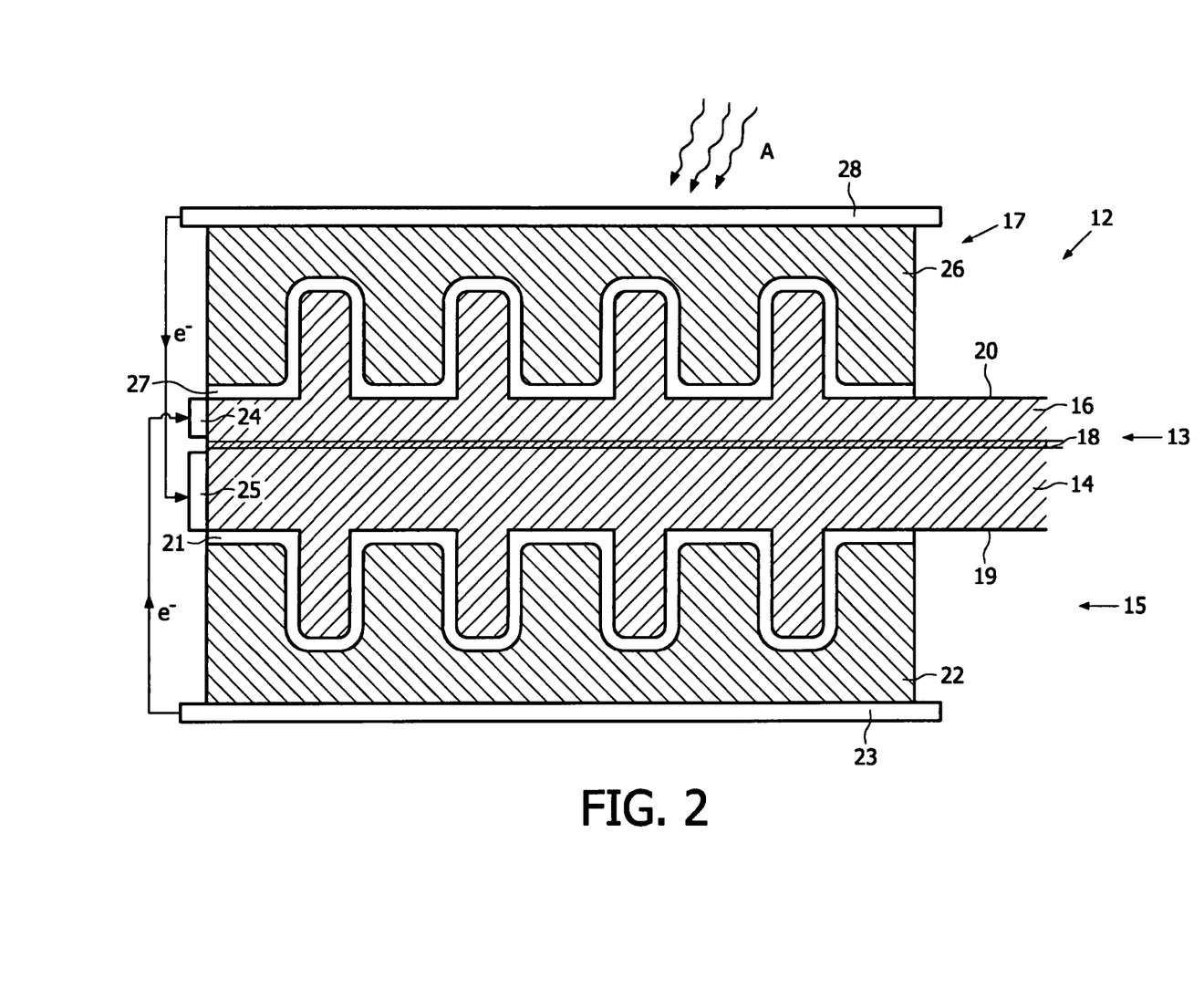
FIG. 2 shows a cross section of another energy system according to the invention.

FIG. 2 shows a cross section of another energy system 12 according to the invention. The energy system 12 comprises a silicon substrate 13 which has a dual functionality. An lower part of the substrate 13 functions as a negative electrode 14 of an electrochemical energy source 15, wherein a substantial part of the energy source 15 is positioned under the substrate 13, and on the other hand an upper part of the substrate 13 functions as positive silicon (p-type) layer 16 for a photovoltaic cell 17. The negative electrode 14 and the positive silicon layer 16 are mutually insulated by means of a barrier layer 18, which may be made of $SiO_2$, to prevent short-circuiting. A lower surface 19 and an upper surface 20 of the substrate 13 are patterned to increase the effective contact surface area of the substrate 13. The energy source 15 further comprises an electrolytic layer 21 deposited onto the lower surface 19 of the substrate 13. On top of the electrolytic layer 21 subsequently a positive electrode 22 made of $LiCoO_2$ is deposited. The positive electrode 22 is partially covered by a current collector 23. Both the positive layer 16 and the negative electrode 14 of the substrate 13 are provided with a current collector 24, 25. The intercalation mechanism and materials used in this energy source 15 are based on intercalation of lithium ions. As already aforementioned the lower surface 19 of the substrate 13 is patterned for improving the energy density of the energy source 15. As the substrate 13, which can be used at the same time as e.g. chip carrier, functions as storage of ions, a relatively effective construction is an energy source 15 can be obtained. The photovoltaic cell 17 further comprises a negative layer (n-type) 26 on top of said positive layer 16, wherein between the negative layer 26 and the positive layer 16 an intermediate layer 27 is formed functioning as a p/n-junction. The negative layer 26 is exposed to solar radiation, in particular to photons (A). The negative layer 26 is covered partially by a current collector 28, the latter being electrically connected to the collector 25 of the negative electrode 14 of the energy source 15. The current collector 23 of the positive electrode 22 is electrically connected to the current collector 24 of the positive layer 16 of the photovoltaic cell 17. In this Figure the electron currents are shown which occur during charging of the energy source 15 by electric energy supplied by the photovoltaic cell 17 due to photoelectric energy conversion with said cell 17. In this way an energetically relatively efficient autonomous micro system 12 can be provided.

Figure 3:
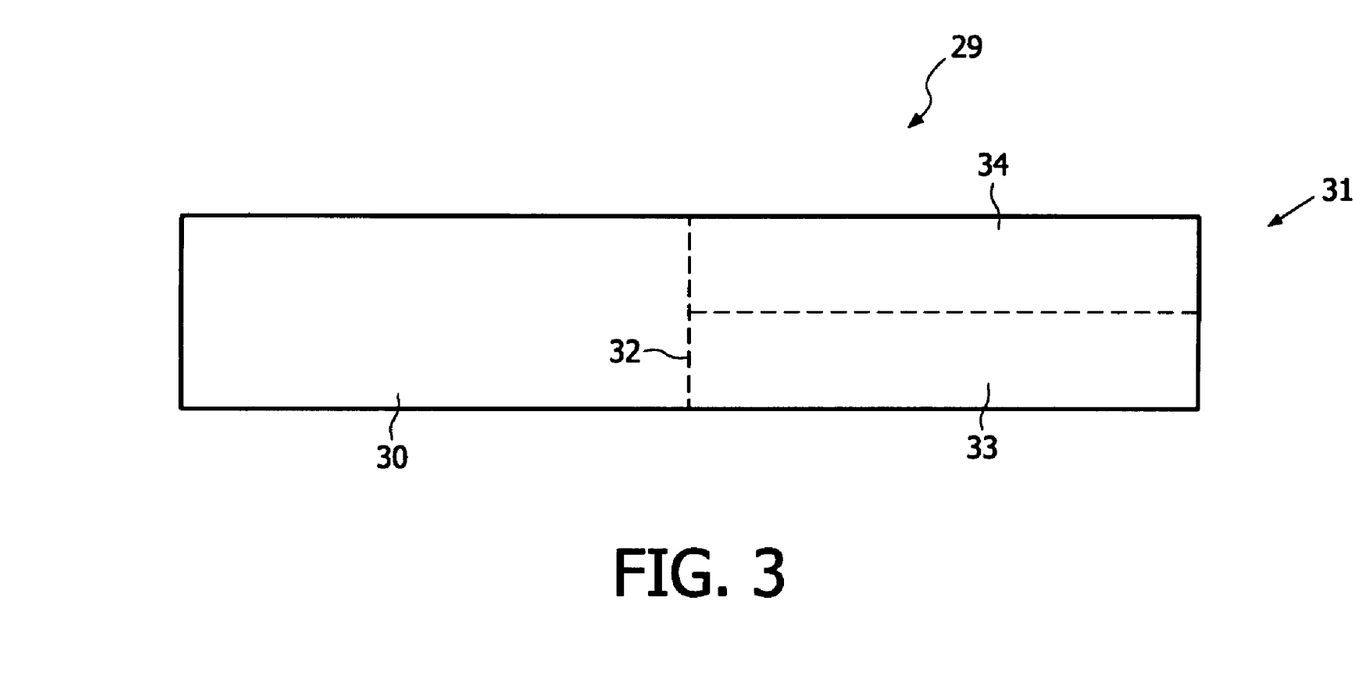
FIG. 3 shows a schematic view of a monolithic system in package according to the invention.

FIG. 3 shows a schematic view of a monolithic system in package (SiP) 29 according to the invention. The SiP comprises an electronic module or device 30 and an energy system 31 according to the invention coupled thereto. The electronic module or device 30 and the energy system 31 are separated by a barrier layer 32. The energy system 31 comprises a stack of an (re)chargeable electrochemical energy source 33 and an energy converter 34 for converting external energy, such as wind energy, mechanical energy, solar energy, into electrical energy for supplying a charging current to the energy source 33. Both the electronic module or device 30 and the energy system 31 are mounted and/or based on the same monolithic substrate (not shown). The construction of the energy source 33 can be arbitrary, provided that the substrate is used as (temporary) storage medium for ions and in this way thus functions as an electrode. The electronic module or device 30 can for example be formed by a display, a chip, a control unit, et cetera. In this way numerous autonomous (ready-to-use) devices can be realized in a relatively simple manner.

Figure 4:
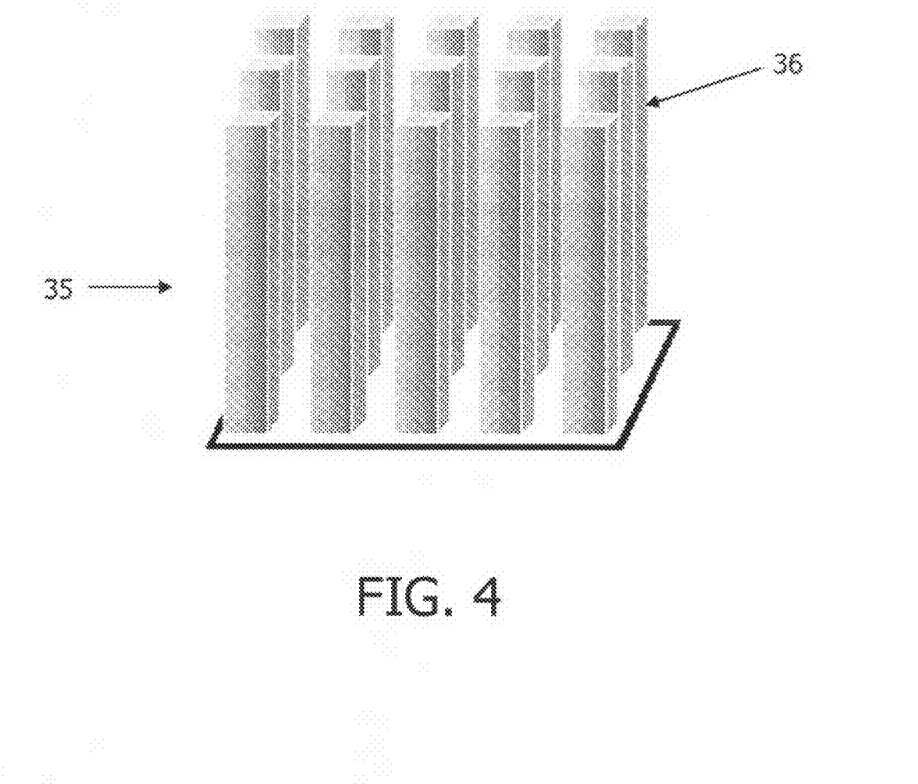
FIG. 4 shows a schematic perspective view of a first electrode to be used within an electrochemical source of an energy system according to the invention.

FIG. 4 shows a schematic perspective view of a first electrode 35 to be used within an electrochemical source of an energy system according to the invention. The electrode 35 comprises multiple bar-like pillars 36, which are oriented substantially vertically (in the orientation shown), and which are positioned substantially equidistantly. The pillars 36 of the first electrode 35 are preferably formed by an etching process. The pillars 36 are preferably at least partially covered by a solid-state electrolyte (not shown) to increase the effective contact area between the first electrode 35 and the electrolyte. In this manner an electrochemical energy source can be realized which is substantially equivalent, though inverted, to the electrochemical energy sources 2, 15 according to FIGS. 1 and 2.

Figure 5:
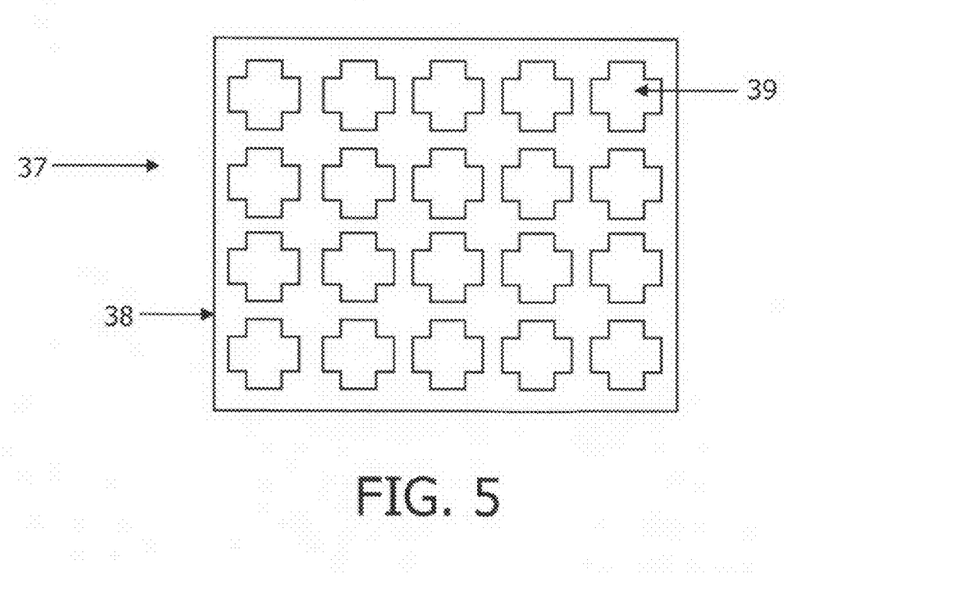
FIG. 5 shows a schematic top view of another first electrode to be used within an electrochemical source of an energy system according to the invention.

FIG. 5 shows a schematic top view of another first electrode 37 to be used within an electrochemical source of an energy system according to the invention. The first electrode 37 comprises a substrate 38 that is provided with multiple pillar-shaped protruding elements 39. The protruding elements 39 each have a substantially cruciform cross-section to (further) increase to the external surface and mechanical strength of each protruding element 39 in a predefined and controlled manner with respect to the external surface of the pillars 36 shown in FIG. 4. During manufacturing of the electrochemical source, the protruding elements 39 (and the substrate 38) of the first electrode 37 are covered by a solid-state electrolyte (not shown) on top of which a second electrode (not shown) is deposited. In this manner an advantageous inverted structure of the electrochemical energy source can be realized with respect to the electrochemical sources 2, 15 according to FIGS. 1 and 2.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. Energy system comprising an electrochemical energy source, wherein said electrochemical energy source comprises at least one assembly of:
   a first storage electrode at least partially adapted for temporary storage of ions,
   a second storage electrode at least partially adapted for temporary storage of ions, and
   an intermediate solid-state electrolyte separating said first electrode and said second electrode,
   wherein said first storage electrode comprises a first conductive substrate on which the solid-state electrolyte and the second storage electrode have been deposited, and that the energy system further comprises an energy conversion means electrically connected to said electrochemical energy source for conversion of external energy into electric energy for charging the electrochemical energy source.

2. Energy system according to claim 1, wherein the first electrode is provided with a plurality of cavities of an arbitrary shape, said electrolyte and said second electrode at least being applied to at least a part of an inner surface of said cavities.

3. Energy system according to claim 2, wherein at least a part of the cavities forms slits, pillars or holes.

4. Energy system according to claim 1, wherein the first electrode is provided with at least one protruding element, said electrolyte and said second electrode at least being deposited onto at least a part of said protruding element.

5. Energy system according to claim 4, wherein the at least one protruding element is formed by a pillar.

6. Energy system according to claim 5, wherein the first electrode is provided with multiple pillars, said electrolyte and said second electrode at least being deposited onto at least a part of said pillars.

7. Energy system according to claim 1, wherein the energy conversion of the energy conversion means is based on at least one of the following energy conversion principles: thermoelectric conversion, photoelectric conversion, magnetoelectric conversion, windelectric conversion, and piezoelectric conversion.

8. Energy system according to claim 1, wherein the energy conversion means is adapted for conversion of durable energy into electrical energy.

9. Energy system according to claim 1, wherein said energy conversion means comprises at least one photovoltaic converter, in particular a solar cell.

10. Energy system according to claim 1, wherein the energy conversion means is connected to both the first electrode and the second electrode.

11. Energy system according to claim 10, wherein the connection of the energy conversion means to at least one of the first electrode and the second electrode is interruptible.

12. Energy system according to claim 1, wherein the energy conversion means is releasably coupled to the electrochemical energy source.

13. Energy system according to one claim 1, wherein said energy conversion means comprises multiple energy conversion cells.

14. Energy system according to claim 1, wherein the energy conversion means comprises a second conductive substrate.

15. Energy system according to claim 14, wherein the first conductive substrate and the second conductive substrate are formed by the same substrate.

16. Energy system according to claim 1, wherein the assembly and the energy conversion means are substantially stacked together.

17. Energy system according to claim 1, wherein the first conductive substrate is adapted for storage of ions of at least one of following atoms: H, Li, Be, Mg, Na and K.

18. Energy system according to claim 1, wherein the first conductive substrate is made of at least one of the following materials: C, Sn, Ge, Pb and doped, Si.

19. Energy system according to claim 1, wherein the solid-state electrolyte and the second electrode are deposited on multiple sides of the first conductive substrate.

20. Energy system according to claim 1, wherein the first electrode further comprises an intercalating top layer deposited onto the first conductive substrate, wherein the intercalating top layer and the first conductive substrate are separated by means of an electron-conductive barrier layer adapted to at least substantially preclude diffusion of intercalating ions into said first conductive substrate.

21. Energy system according to claim 20, wherein said barrier layer is at least substantially made of at least one of the following compounds: tantalum, tantalum nitride, titanium, and titanium nitride.

22. Electronic module provided with at least one energy system according to one of claim 1.

23. Electronic device provided with at least one energy system according to one of the claim 1.

24. Electronic device according to claim 23, wherein the electronic device is formed by an integrated circuit (IC).

25. Electronic device according to claim 23, wherein the electronic device and the energy system form a System in Package (SiP).

26. Method for manufacturing of an energy system according to claim 1, comprising the steps of:
depositing a solid-state electrolyte onto a first conductive substrate,
depositing a second electrode onto the solid-state electrolyte, and
subsequently electrically connecting an energy conversion means to both the first conductive substrate and the second electrode.

27. Method according to claim 26, wherein the method is provided with step D) comprising patterning at least one contact surface of the first conductive substrate, wherein step D) is applied prior to step A).

28. Method according to claim 26, wherein the method is provided with step E) comprising subsequently depositing of an electron-conducting barrier layer and an intercalating top layer onto the substrate, wherein step E) is applied prior to step A).

* * * * *